United States Patent
Kumar et al.

(10) Patent No.: US 9,604,269 B2
(45) Date of Patent: Mar. 28, 2017

(54) METHOD AND SYSTEM BASED ON THERMOPLASTIC FORMING TO FABRICATE HIGH SURFACE QUALITY METALLIC GLASS ARTICLES

(75) Inventors: Golden Kumar, Lubbock, TX (US); Jan Schroers, Hamden, CT (US); Jerzy Blawzdziewicz, Lubbock, TX (US); Thomas Hodges, North Haven, CT (US)

(73) Assignee: Yale University, New Haven, CT (US)

( * ) Notice: Subject to any disclaimer, the term of this patent is extended or adjusted under 35 U.S.C. 154(b) by 990 days.

(21) Appl. No.: 13/808,969

(22) PCT Filed: Jul. 8, 2011

(86) PCT No.: PCT/US2011/043428
§ 371 (c)(1),
(2), (4) Date: Jul. 24, 2014

(87) PCT Pub. No.: WO2012/006571
PCT Pub. Date: Jan. 12, 2012

(65) Prior Publication Data
US 2015/0158067 A1    Jun. 11, 2015

Related U.S. Application Data

(60) Provisional application No. 61/362,396, filed on Jul. 8, 2010.

(51) Int. Cl.
*B21C 23/01* (2006.01)
*B21C 33/02* (2006.01)
(Continued)

(52) U.S. Cl.
CPC ............ *B21C 23/01* (2013.01); *B21C 29/003* (2013.01); *B21C 31/00* (2013.01); *B21C 33/02* (2013.01);
(Continued)

(58) Field of Classification Search
CPC ... B29C 43/003; B29C 43/36; B29C 37/0053; B29C 2043/3615;
(Continued)

(56) References Cited

U.S. PATENT DOCUMENTS 6,290,900 B1    9/2001    Hatano et al.
6,915,834 B2    7/2005    Knott et al.
(Continued)

FOREIGN PATENT DOCUMENTS

WO    WO 2012/006571 A2    1/2012

OTHER PUBLICATIONS

Brown, Preparation of Ultrasmooth Surfaces, Ann. Rev. of Mater. Sci. 16: pp. 371-388, (1986).
(Continued)

*Primary Examiner* — Peter DungBa Vo
*Assistant Examiner* — John S Lowe
(74) *Attorney, Agent, or Firm* — McCarter & English, LLP

(57) ABSTRACT

A method of processing BMGs in a non-ideal environment (such as air) to create a uniform and smooth surface is provided. By utilizing the contact-line movement and an engineered flow pattern during TPF the method is able to create complex BMG parts that exhibit uniform smooth appearance or even can be atomically smooth. In addition, to mending surface imperfections, this method also eliminates void formation inside the material, allows for the creation of precise patterns of homogeneous appearance, and forms improved mechanical locks between different materials and a BMG.

12 Claims, 16 Drawing Sheets

(51) Int. Cl.
| | | |
|---|---|---|
| B21C 31/00 | (2006.01) | |
| B21C 29/00 | (2006.01) | |
| C22C 45/00 | (2006.01) | |
| C22C 1/00 | (2006.01) | |
| B29C 43/00 | (2006.01) | |
| B29C 43/36 | (2006.01) | |
| B29C 37/00 | (2006.01) | |
| B21B 27/06 | (2006.01) | |
| C22C 45/10 | (2006.01) | |

(52) U.S. Cl.
CPC ........ *B29C 37/0053* (2013.01); *B29C 43/003* (2013.01); *B29C 43/36* (2013.01); *C22C 1/002* (2013.01); *C22C 45/003* (2013.01); *C22C 45/10* (2013.01); *B21B 27/06* (2013.01); *B29C 2043/3615* (2013.01); *B29C 2043/3628* (2013.01)

(58) Field of Classification Search
CPC . B29C 2043/3628; C22C 1/002; C22C 45/10; C22C 45/003; B21C 33/02; B21C 23/01; B21C 29/003; B21C 31/00; B21B 27/06
USPC ............... 72/202, 253.1, 270, 324, 364, 418
See application file for complete search history.

(56) References Cited

U.S. PATENT DOCUMENTS

| | | | |
|---|---|---|---|
| 7,017,645 B2 | 3/2006 | Johnson et al. | |
| 7,582,172 B2 | 9/2009 | Schroers et al. | |
| 7,708,844 B2* | 5/2010 | Muramatsu | B21D 37/01 |
| | | | 148/557 |
| 7,794,553 B2 | 9/2010 | Duan et al. | |
| 7,896,982 B2 | 3/2011 | Johnson et al. | |
| 8,613,813 B2 | 12/2013 | Johnson et al. | |
| 8,641,839 B2* | 2/2014 | Schroers | C22C 45/00 |
| | | | 148/522 |
| 9,057,120 B2* | 6/2015 | Pham | C22C 1/002 |
| 2002/0121157 A1 | 9/2002 | Knott et al. | |
| 2008/0135138 A1 | 6/2008 | Duan et al. | |
| 2009/0236017 A1 | 9/2009 | Johnson et al. | |

OTHER PUBLICATIONS

Hegner, et al., Ultralarge Atomically Flat Template-Stripped Au Surfaces for Scanning Probe Microscopy, Surface Science 291 (1-2): pp. 39-46, (1993).
Busch, et al., Decomposition and Primary Crystallization in Undercooled Zr41.2Ti13.8Cu12.5Ni10.0Be22.5 Melts, Applied Physics Letters 67 (11), pp. 1544-1546, (1995).
Greer, Metallic Glasses, Science 267 (5206), pp. 1947-1953, (1995).
Kawamura, et al., Full Strength Compacts by Extrusion of Glassy Metal Powder at the Supercooled Liquid State, Applied Physics Letters 67 (14), pp. 2008-2010, (1995).
Teichert, et al., Comparison of Surface Roughness of Polished Silicon Wafers Measured by Light Scattering Topography, Soft-X-ray Scattering, and Atomic-Force Microscopy, Applied Physics Letters 66 (18), pp. 2346-2348, (1995).
Agarwal, et al., Low-loss Polycrystalline Silicon Waveguides for Silicon Photonics, Journal of Applied Physics 80 (11), pp. 6120-6123, (1996).
Aizenberg, et al., Controlling Local Disorder in Self-Assembled Monolayers by Patterning the Topography of Their Metallic Supports, Nature 394 (6696), pp. 868-871, (1998).
Allara, et al., Evolution of Strategies for Self-Assembly and Hookup of Molecule-Based Devices, Molecular Electronics: Science and Technology 852, pp. 349-370, (1998).
Feldheim, et al., Self-Assembly of Single Electron Transistors and Related Devices, Chemical Society Reviews 27 (1), pp. 1-12, (1998).
Chung, et al., Silicon Nanowire Devices, Applied Physics Letters 76 (15), pp. 2068-2070, (2000).
Gleiche, et al., Nanoscopic Channel Lattices with Controlled Anisotropic Wetting, Nature 403 (6766), pp. 173-175, (2000).
Inoue, Stabilization of Metallic Supercooled Liquid and Bulk Amorphous Alloys, Acta Materialia 48 (1), pp. 279-306, (2000).
Cui, et al., Functional Nanoscale Electronic Devices Assembled Using Silicon Nanowire Building Blocks, Science 291 (5505), pp. 851-853, (2001).
Saotome, et al., Superplastic Nanoforming of Pd-Based Amorphous Alloy, Scripta Materialia 44 (8-9), pp. 1541-1545, (2001).
Hua, et al., Polymer Imprint Lithography with Molecular-Scale Resolution, Nano Letters 4 (12), pp. 2467-2471, (2004).
Miracle, A Structural Model for Metallic glasses, Nature Materials 3 (10), pp. 697-702, (2004).
Wang, et al., Bulk Metallic Glasses, Materials Science & Engineering R-Reports 44(2-3), pp. 45-89, (2004).
Islam, et al., Dramatically Improved Yields in Molecular Scale Electronic Devices Using Ultra-smooth Platinum Electrodes Prepared by Chemical Mechanical Polishing, 2005 5th Ieee Conference on Nanotechnology, vol. 1, pp. 80-83, (2005).
Khurshudov, et al., Roughness Effects on Head-Disk Interface Durability and Reliability, Tribology International 38 (6-7), pp. 646-651, (2005).
Ryu, et al., A Generalized Approach to the Modification of Solid Surfaces, Science 308 (5719), 236-239, (2005).
Schroers, The Superplastic Forming of Bulk Metallic Glasses, JOM, 57(5): pp. 35-39, (2005).
Higo, et al., Surface Morphology of Metal Films Deposited on Mica at Various Temperatures Observed by Atomic Force Microscopy, Applied Surface Science 252 (14), pp. 5083-5099, (2006).
Logeeswaran, et al., Ultra-Smooth Metal Surfaces Generated by Pressure-Induced Surface Deformation of Thin Metal Films, Applied Physics a-Materials Science & Processing 87 (2), pp. 187-192, (2007).
Schuh, et al., Mechanical Behavior of Amorphous Alloys, Acta Materialia 55 (12), pp. 4067-4109, (2007).
Schroers, On the Formability of Bulk Metallic Glass in its Supercooled Liquid State, Acta Materialia 56 (3), pp. 471-478, (2008).
Chiu, et al., Thermoplastic extrusion of bulk metallic glass, Scripta Materialia, 61(1): pp. 28-31, (2009).
Kumar, et al., Nanomoulding with Amorphous Metals, Nature 457 (7231), pp. 868-872, (2009).
Nagpal, et al., Ultrasmooth Patterned Metals for Plasmonics and Metamaterials, Science 325 (5940), pp. 594-597, (2009).
Schroers, Processing of Bulk Metallic Glass, Advanced Materials, 22: pp. 1566-1597, (2010).
PCT International Search Report and Written Opinion dated Feb. 21, 2012 for PCT International Application No. PCT/US2011/043428.
PCT/US2011/043428, Jul. 8, 2011, WO 2012/006571.
U.S. Appl. No. 61/362,396, filed Jul. 8, 2010.
Hegner, M. et al., Ultralarge atomically flat template-stripped Au surfaces for scanning probe microscopy, Surface Science 291, pp. 39-46 (1993).
PCT International Written Opinion dated Feb. 12, 2012.

* cited by examiner

A

B

METHOD AND SYSTEM BASED ON THERMOPLASTIC FORMING TO FABRICATE HIGH SURFACE QUALITY METALLIC GLASS ARTICLES

STATEMENT OF FEDERAL FUNDING

The U.S. Government has certain rights in this invention pursuant to Grant No. CMMI-0928227 awarded by the National Science Foundation.

FIELD OF THE INVENTION

The current invention is directed to a mechanism of forming and surface smoothening bulk metallic glasses by controlling flow patterns during thermoplastic forming.

BACKGROUND OF THE INVENTION

Macroscopically, rough surfaces wear more quickly and dissipate higher thermal energy due to friction compared to smooth surfaces. On the atomic scale, a material's surface structure largely controls its functional properties such as wetting, adhesion, adsorption, scattering, and chemical reactivity. (J. Aizenberg, A. J. Black, and G. M. Whitesides., *Nature* 394 (6696), 868-871 (1998); M. Gleiche, L. F. Chi, and H. Fuchs, *Nature* 403 (6766), 173-175 (2000); and D. Y. Ryu, K. Shin, E. Drockenmuller et al., *Science* 308 (5719), 236-239 (2005), the disclosures of each of which are incorporated herein by reference.) In nano-devices fabricated using bio-molecules, DNA, self-assembled monolayers, nanowires, and nanoimprinting, surface roughness has been found to be the main cause of decreased circuit yield, low device reliability, and scattering losses. (M. S. Islam, Z Li, S. C. Chang et al. *Dramatically Improved Yields in Molecular Scale Electronic Devices Using Ultra-smooth Platinum Electrodes Prepared By Chemical Mechanical Polishing.* 2005 *5th Ieee Conference on Nanotechnology* vol. 1, 80-83 (2005); and A. M. Agarwal, L. Liao, J. S. Foresi et al., *Journal of Applied Physics* 80 (11), 6120-6123 (1996), the disclosures of each of which are incorporated herein by reference.) In addition, the emerging field of plasmonic devices requires patterned metal films without unwanted roughness that can cause scattering or absorption of plasmons, degrading the device performance. (P. Nagpal, N. C. Lindquist, S. H. Oh et al., *Science* 325 (5940), 594-597 (2009), the disclosure of which is incorporated herein by reference.) Ultraflat surfaces are also important in reliable data storage media. (A. Khurshudov and V. Raman, *Tribology International* 38 (6-7), 646-651 (2005), the disclosure of which is incorporated herein by reference.) Thus, a wide range of applications would benefit from a material and an associated high-throughput process capable of yielding smooth and nano-patterned surfaces in a single step.

Typical surface roughness values that can be obtained for metals by polishing without resort to special equipment range from 25 to 500 nm. (N. J. Brown, *Annual Review of Materials Science* 16, 371-388 (1986), the disclosure of which is incorporated herein by reference.) A special combination of chemical and mechanical polishing (CMP) designed for single crystal semiconductors is usually not suitable for polycrystalline metals because metals are softer and the hard slurry particles damage the metal surface. (V. J. Logeeswaran, M. L. Chan, Y. Bayam et al., *Applied Physics a—Materials Science & Processing* 87 (2), 187-192 (2007), the disclosure of which is incorporated herein by reference.) Thin films are often smoother than bulk materials, but their residual roughness depends on the thickness of the film and the deposition temperature. (M. Higo, K. Fujita, Y. Tanaka et al., *Applied Surface Science* 252 (14), 5083-5099 (2006), the disclosure of which is incorporated herein by reference.) Even ultra thin films deposited at low temperatures exhibit non-negligible roughness values and have a limited physical stability.

Recently, a template-stripping technique has been shown to produce much smoother surfaces. (M. Hegner, P. Wagner, and G. Semenza, *Surface Science* 291 (1-2), 39-46 (1993), the disclosure of which is incorporated herein by reference.) Although this technique can significantly reduce the surface roughness, the intrinsic roughness due to the polycrystallinity of films imposes an ultimate limit. Moreover, the control of roughness and patterning on non-planar complex surfaces is difficult to achieve using these techniques. This is also true for single crystals, which can be atomically smooth but can only be grown from a limited range of materials under stringent conditions.

Bulk metallic glasses (BMGs) can be prepared from a wide range of chemical compositions and they display high strength and elasticity as a consequence of their amorphous structure. (A. L. Greer, *Science* 267 (5206), 1947-1953 (1995); A. Inoue, *Acta Materialia* 48 (1), 279-306 (2000); W. H. Wang, C. Dong, and C. H. Shek, *Materials Science & Engineering R-Reports* 44 (2-3), 45-89 (2004); and C. A. Schuh, T. C. Hufnagel, and U. Ramamurty, *Acta Materialia* 55 (12), 4067-4109 (2007), the disclosures of each of which are incorporated herein by reference.) These BMG materials have also gained significant scientific and technological interest due to their unique combination of mechanical properties and their amenability to novel processing techniques. A property unique among metals is that they exhibit a supercooled liquid region, a temperature region where the metallic glass first relaxes into a supercooled liquid before it eventually crystallizes. This unique softening behavior has been utilized for thermoplastic forming, (TPF) a processing method similar to the one used for plastic processing. (J. Schroers, *Advanced Materials,* 2010, 22: p. 1566-1597, the disclosure of which is incorporated herein by reference.) Various processing methods have been suggested based on TPF including extrusion, compression moulding, blow moulding, micro and nano-imprinting. As a method to fabricate solid complex 3D parts compression moulding has been explored. Typically in compression moulding the material is positioned in the mould cavity and the mould is closed to fill the entire cavity. This method has proven to be very efficient with plastics and was also explored for BMGs.

Metals exhibit high-energy surfaces and thus act as favourable sites for oxides and other surface contaminants, particularly at elevated temperatures. As a consequence, even BMGs, with a liquid-like structure, are microscopically rough in the as-prepared state. Additional surface roughness may originate from processing techniques such as casting, cutting, machining, and grinding etc. This starting roughness remains a part of the final BMG structure when fabricated by typical TPF methods because of the initial contact-area between the mould and the BMG. Although BMGs have shown self smoothening behaviours in the SCLR, the time scale on which it occurs can be longer than the desired forming time. Typical TPF time of 1-3 min is insufficient to smoothen features larger than 5 μm by surface tension alone. Additionally, any oxides which exist prior to or appear during processing remain solid and inhibit this phenomenon. Accordingly, a need exists for improved methods of forming BMGs.

SUMMARY OF THE INVENTION

The current invention is directed to a method and system for controlling the flow pattern of BMG materials during TPF forming to drastically reduce the surface roughness of articles formed.

In one embodiment, the invention is directed to a method of shaping a bulk metallic glass including:
  providing a bulk metallic glass feedstock having an inner bulk region surrounded by an initial rough outer surface region, where the feedstock is heated to a temperature within thermoplastic zone of the bulk metallic glass;
  placing the outer region of the feedstock into contact with at least one solid surface in fluid communication with a shaping tool;
  inducing the feedstock to flow along the solid surface toward the shaping tool such that the leading edge of the flow of the feedstock forms a contact-line with the solid surface, where the motion of the contact-line along the solid surface induces an interfacial flow of the feedstock material from the bulk towards the solid surface; and
  maintaining the flow of the feedstock along the solid surface until substantially all of the initial outer region of the feedstock at the contact-line of the alloy is replaced with a new smooth outer region formed from the interfacial flow of the bulk of the feedstock to the outer region of the feedstock prior to the feedstock coming into contact with the shaping tool.

In such an embodiment the replacement of the outer region of the feedstock is a function of the equation:

$$n = n_o \exp\left(-\frac{\alpha S}{A}\right)$$

where n is the density of rough regions on the outer region of the feedstock, $n_o$ is the initial density of rough regions on the initial rough outer region, S is the area of contact between the feedstock and the solid surface behind the contact-line, A is the area of the outer surface of the feedstock not in contact with the solid surface, and $\alpha$ is a constant dependent on the dynamic contact angle between the contact-line of the feedstock and the solid surface. In one such embodiment, the contact angle is around 90°.

In another embodiment, the feedstock is placed into contact with at least two parallel solid surfaces. In one such embodiment, the at least two solid surfaces form a channel.

In still another embodiment, the at least one shaping tool is selected from the group consisting of dies, compression moulds and extrusion tools. In one such embodiment, the shaping tool includes at least one feature that has a dimensional scale of less than 50 nm. In another such embodiment, the shaping tool is a compression mould and the point of initial contact between the feedstock and the solid surface is outside the area of the at least one shaping tool. In still another such embodiment, there are at least two shaping tools.

In yet another embodiment, the step of inducing the flow is performed by applying a pressure to the feedstock. In one such embodiment, the application of force can be varied to engineer the direction and speed of the flow of the feedstock.

In still yet another embodiment, the method is directed to forming atomically smooth articles. In one such embodiment within 1 to 10 nm of the contact-line a stress of $10^3$-$10^5$ MPa is exerted on the outer surface of the feedstock. In another such embodiment, the at least one solid surface is atomically smooth. In still another such embodiment, the bulk metallic glass is based on an inert material selected from the group consisting of Pt, Au, Pd and Ni.

The invention is also directed to a system for shaping a bulk metallic glass including:
  a reservoir of a bulk metallic glass feedstock having an inner bulk region surrounded by an initial rough outer surface region, the feedstock being heated to a temperature within thermoplastic zone of the bulk metallic glass;
  a pre-forming flow device formed of at least one solid surface in fluid communication between the reservoir and at least one shaping tool;
  a pressurizing device for inducing the feedstock to flow along the at least one solid surface toward the shaping tool such that the leading edge of the flow of the feedstock forms a contact-line with the solid surface, and wherein the motion of the contact-line along the solid surface induces an interfacial flow of the feedstock material from the bulk towards the solid surface; and
  wherein the at least one solid surface is designed and disposed to maintain the flow of the feedstock therealong until substantially all of the initial outer region of the feedstock at the contact-line of the alloy is replaced with a new smooth outer region formed from the interfacial flow of the bulk of the feedstock to the outer region of the feedstock prior to the feedstock coming into contact with the at least one shaping tool.

In one embodiment, of the system the pre-forming flow device includes at least two parallel solid surfaces between which the feedstock flows. In one such embodiment, the at least two solid surfaces form a channel.

In another embodiment, the pre-forming flow device is an extrusion channel and the at least one shaping tool is a hot roller.

In still another embodiment, the pre-forming flow device is an extrusion channel and the at least one shaping tool is a batch mould.

In yet another embodiment, the shaping tool includes at least one feature that has a dimensional scale of less than 50 nm.

In still yet another embodiment, the at least one shaping tool is at least one compression mould wherein the point of initial contact between the feedstock and the solid surface is outside the area of the mould.

In still yet another embodiment the system includes a cutting tool disposed adjacent to the at least one shaping tool such that the cutting tool can separate an article formed in the at least one shaping tool from the feedstock remaining in the pre-forming flow device.

In still yet another embodiment, the force and direction of the pressure applied by the pressurizing device may be varied such that the direction and speed of the flow of the feedstock may be controlled.

In still yet another embodiment the system includes at least two shaping tools.

In still yet another embodiment the system forms atomically smooth articles. In one such embodiment within 1 to 10 nm of the contact-line a stress of $10^3$-$10^5$ MPa is exerted on the outer surface of the feedstock. In another such embodiment, the at least one solid surface is atomically smooth. In still another such embodiment, the bulk metallic glass is based on an inert material selected from the group consisting of Pt, Au, Pd and Ni.

BRIEF DESCRIPTION OF THE DRAWINGS

The description will be more fully understood with reference to the following figures and data graphs, which are presented as exemplary embodiments of the invention and should not be construed as a complete recitation of the scope of the invention, wherein.

DETAILED DESCRIPTION OF THE INVENTION

Figure 1:
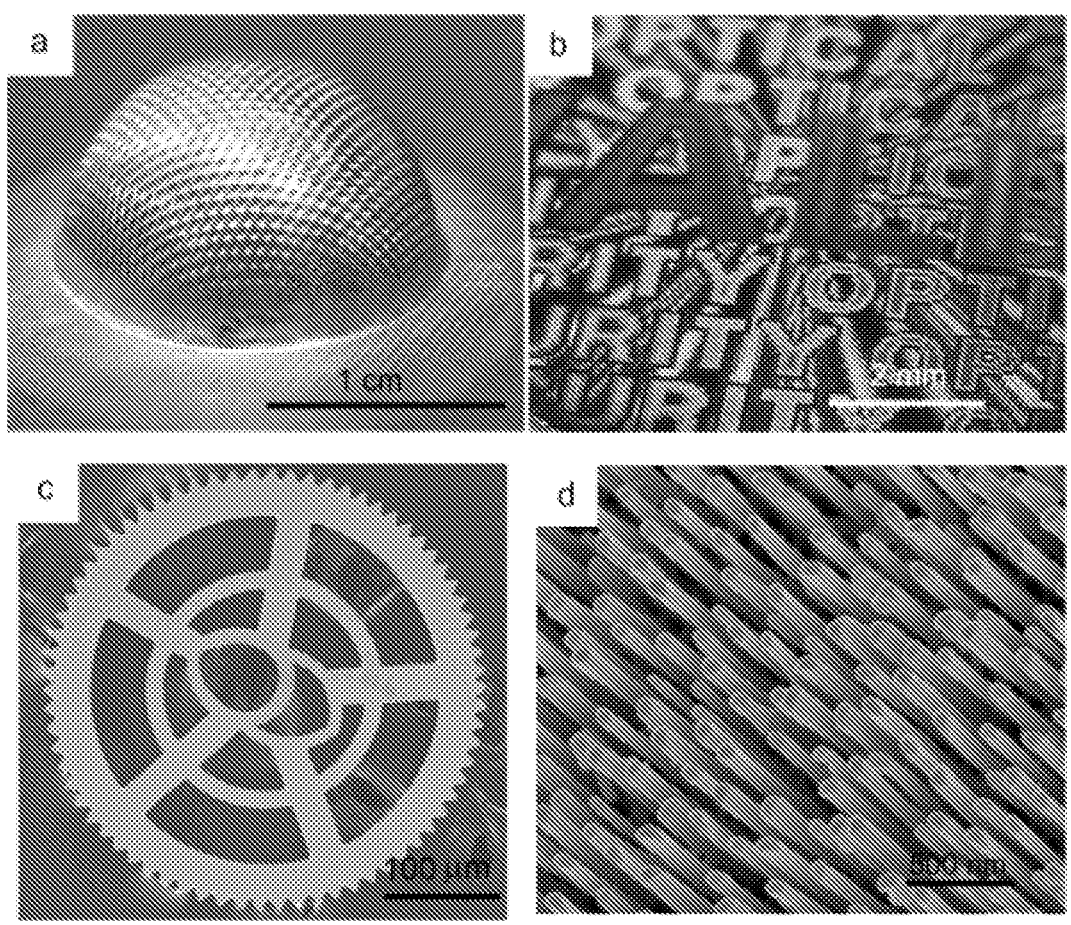
FIGS. 1A to 1D provide images of planar and non-planar BMG parts fabricated by TPF-based forming methods, including: (A) a hemispherical patterned surface prepared by blow moulding, (B) a hologram, (C) a three-dimensional gear, and (D) nano-rods fabricated by hot embossing.

The current invention is directed to a method and system for controlling the flow pattern of BMG materials during TPF forming to drastically reduce the surface roughness of articles formed. The invention is also directed to TPF methods and systems in which the initial contact-area between BMG and mould is not part of the final product or will not be part of the area where surface finish is of concern. It is demonstrated that by engineering the flow pattern and high stresses around the moving contact-line during TPF, smooth and homogeneous surfaces can be fabricated, which can, under certain circumstances, be atomically smooth.

Definitions

The term BMG for the purposes of this invention shall mean an alloy that can maintain the irregular atomic structure of its liquid phase in a solid phase when the cooling rate applied to the solidification is high enough to limit nucleation and growth of the crystalline phase. Exemplary materials may be found, for example, in U.S. Pat. Nos. 5,288,344; 5,368,659; 5,618,359; and 5,735,975, the disclosures of which are incorporated herein by reference.

The term TPF for the purposes of this invention shall mean a forming state in which the BMG alloy is shaped by maintaining the alloy at a temperature in a thermoplastic zone, which is below a temperature, $T_{nose}$, (where, the resistance to crystallization is minimum) and above the glass transition temperature, Tg, during the shaping or moulding step The term channel for the purposes of this invention shall mean any structure designed to direct the flow of a BMG in a TPF condition toward a shaping tool.

The term shaping tool for the purposes of this invention shall mean any structure designed to form a BMG in a TPF condition into a final article, such as, for example, a die, mould, or cast.

The term contact-line for the purposes of this invention shall mean the point at which the outer surface of the leading edge of the flowing BMG material comes into contact with the walls of the surrounding channel.

Background on Surface Roughness

Surface roughness is detrimental in most engineering applications. For example, ultrasmooth surfaces are required in the field of nano-devices where the device size becomes comparable or smaller than the typical surface roughness value, and the success and proliferation of such future devices hinge on the atomic-level control of surface roughness. The consideration of surface smoothness is also particularly important for applications where smooth aesthetic appearance is desired such as jewellery, watches, mirrors, reflectors, perfume bottles, and electronic casings. Unfortunately, it is difficult and expensive to control surface roughness, particularly in nano-devices where the device size is comparable to the surface roughness or grain size of crystalline materials. (D. L. Allara, T. D. Dunbar, P. S. Weiss et al., *Molecular Electronics: Science and Technology* 852, 349-370 (1998); D. L. Feldheim and C. D. Keating, *Chemical Society Reviews* 27 (1), 1-12 (1998) S. W. Chung, J. Y. Yu, and J. R. Heath, *Applied Physics Letters* 76 (15), 2068-2070 (2000); and Y. Cui and C. M. Lieber, *Science* 291 (5505), 851-853 (2001), the disclosures of each of which are incorporated herein by reference.) The minimum achievable roughness for a material is dictated by the size of its intrinsic structure, which may consist of molecules, polymer chains, crystal defects or polycrystals.

Amorphous metals or bulk metallic glasses (BMGs) are free from such intrinsic structural limitations and exhibit a homogeneous and isotropic structure. (D. B. Miracle, *Nature Materials* 3 (10), 697-702 (2004), the disclosure of which is incorporated herein by reference.) A BMG softens into a viscous liquid above its glass transition, and this softening has been widely exploited for thermoplastic forming (TPF), a technique which is unique among metals, in which the alloy in either a continuous or batch process, is shaped by maintaining the alloy at a temperature in a thermoplastic zone, which is below a temperature, $T_{nose}$, (where, the resistance to crystallization is minimum) and above the glass transition temperature, Tg, during the shaping or moulding step. (For a full discussion of the TPD process, see, e.g., U.S. Pat. Nos. 7,017,645 & 7,794,553; Y. Kawamura, H. Kato, A. Inoue et al., *Applied Physics Letters* 67 (14), 2008-2010 (1995); Y. Saotome, K. Itoh, T. Zhang et al., *Scripta Materialia* 44 (8-9), 1541-1545 (2001); G. Kumar, H. X. Tang, and J. Schroers, *Nature* 457 (7231), 868-872 (2009); and J. Schroers, *Advanced Materials* 21, 1-32 (2009), the disclosures of each of which are incorporated herein by reference.)

It has been shown that complex shapes with dimensions from nanometers to several centimeters can be readily produced via TPF of metallic glasses. (J. Schroers, *Acta Materialia* 56 (3), 471-478 (2008), the disclosure of which is incorporated herein by reference.) FIG. 1 shows an example of various BMG parts fabricated by TPF-based processes. These parts demonstrate excellent apparent surface finish and precise mould replication of planar and non-planar surfaces achieved using TPF-based processing of BMGs. However, although BMGs have shown self smoothening behaviours in the SCLR, the time scale on which it occurs can be longer than the desired forming time. Typical TPF times of 1-3 min are insufficient to smoothen features larger than 5 µm by surface tension alone. In fact, it has been surprisingly discovered that TPF of metallic glasses using conventional flow patterns only leads to a marginal reduction in surface roughness, and cannot yield atomically smooth surfaces or eliminate the imprint of the initial contact-area with the mould. In particular, for technologically interesting alloys based on Zr, Fe, Cu, the oxidation tendency is quite pronounced and even careful processing cannot eliminate surface roughness.

Discussion of Flow Pattern Smoothing on the Visible Scale

It has now been discovered that by engineering the contact-line movement and the resulting flow pattern of a BMG during TPF it is possible to create complex BMG parts that have a number of advantages, including exhibit uniform smooth appearance or even atomic smoothness in non-ideal environments (such as air). In addition to mending surface imperfections, the method of the current invention eliminates void formation inside the material. A smooth and homogenous surface is also required when surface patterns are applied onto the BMG surface, hence the current invention allows for the creation of precise patterns of homogeneous appearance. Finally, because mechanically locking a different material into the BMG also requires a smooth surface that is substantially free from impurities, the current invention can improve the joining of BMG parts to other materials.

To understand how the method of the invention functions, it is necessary to consider the BMG flow pattern near the advancing BMG-air-substrate contact-line at the outer perimeter of the sample during TPF. The flow of a BMG during TPF can be described to a good approximation as a creeping flow. (J. Schroers, *JOM*, 2005, 57(5): p. 35-39, the disclosure of which is incorporated herein by reference.) It has been shown that motion of the contact-line induces interfacial flow towards the solid surface when a fluid moves on a solid. (H. M. Chiu, G. Kumar, J. Blawzdziewicz, and J. Schroers, Scripta Materialia, 2009. 61(1): p. 28-31, the disclosure of which is incorporated herein by reference.) As illustrated schematically in FIGS. 2A and 2B, the current invention uses the flow of the viscous BMG to transport the rough surface layer towards the BMG-substrate interface. This process results in efficient removal of the surface roughness during the initial stage of forming. Consequently, the concentration of rough regions, n, on the advancing BMG-air interface rapidly decreases. It can be mathematically illustrated that the decay of n is an exponential function of the area S of the BMG-substrate interface behind the contact-line:

$$n = n_o \exp\left(-\frac{\alpha S}{A}\right) \qquad \text{EQ. 1}$$

where, $n_o$ is the initial density of rough regions on the free BMG surface A and the constant α depends on the dynamic contact angle.

Figure 2:
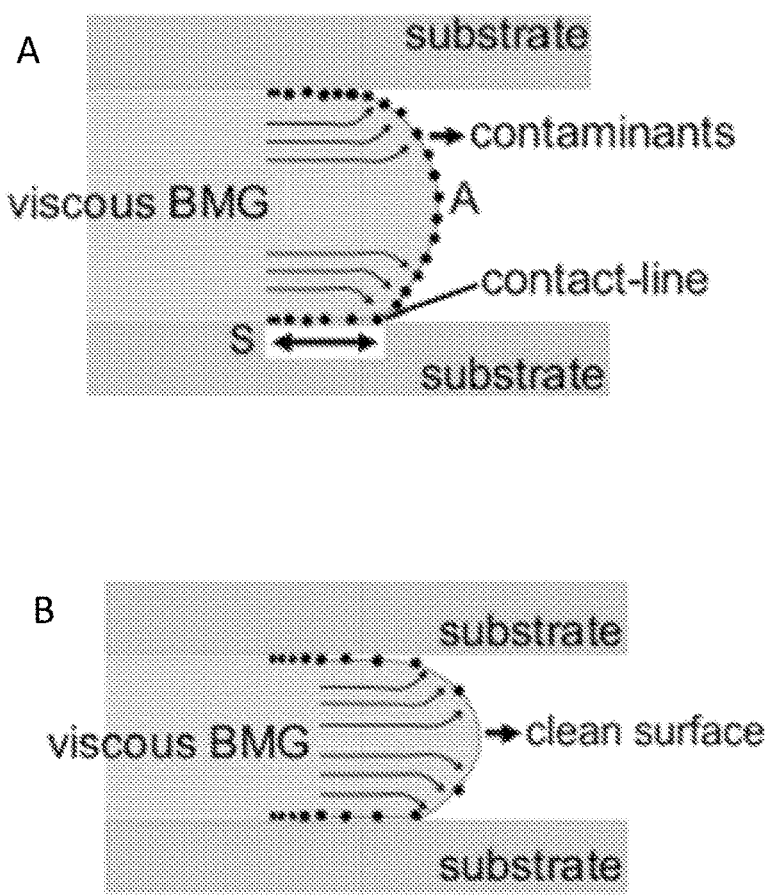
FIGS. 2A to 2C provide schematics and data graphs describing the evolution of the BMG surface during different stages of TPF-based disc forming between two smooth substrates in accordance with the current invention wherein: (A) shows the evolution of a smooth surface during different stages of forming, where the initial surface is rough due to the presence of rigid surface contaminants and after the intermediate stage of TPF, the centre of the formed BMG still appears rough but is surrounded by a smooth outer region, which extends during further deformation, (B) provides a schematic illustration of viscous BMG flowing between two smooth substrates, where the streamlines near the contact-line describe the process of removal of surface contaminants from the BMG-air interface, (C) shows a schematic of the clean BMG-air interface that is exposed after most of the contaminants have been removed by the flow pattern associated with the moving contact-line.
Figure 2:
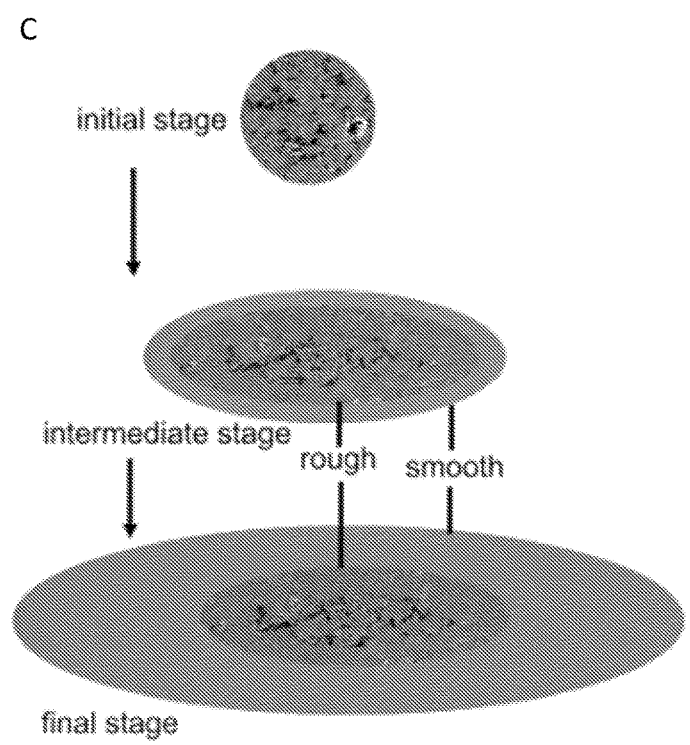

In summary, as shown in FIG. 2A, in a first step of the current invention the flow of the BMG under thermoplastic conditions is allowed to continue until the rough surface layer has been removed from the free BMG surface. Once this condition has been met, as shown in FIG. 2B, the advancing viscous BMG front becomes clean. In the current invention, the flow of the BMG is engineered such that the BMG material does not interact with the desired forming tool until the concentration of rough regions n drops sufficiently low to ensure a smooth forming tool BMG interface.

A diagrammatic example of the method is provided in FIG. 2C, which shows the evolution of the BMG surface during different stages of TPF-based disc forming between two smooth substrates. As shown, initially the surface of the BMG is rough due to either pre-processing artifacts or the presence of surface oxides and other contaminants. During the intermediate stage of disc forming, the centre of the disc remains rough, but the roughness decreases abruptly from the centre to the outer region. The outer region of the specimen becomes smooth, and any subsequent forming increases the size of this smooth region (final stage). By engineering the flow of the BMG such that only the "smooth region" of the BMG interacts with the shaping tool, it is possible to produce dramatically improved articles without resorting to exotic methods, such as operation in inert environments, etc.

Figure 3A:
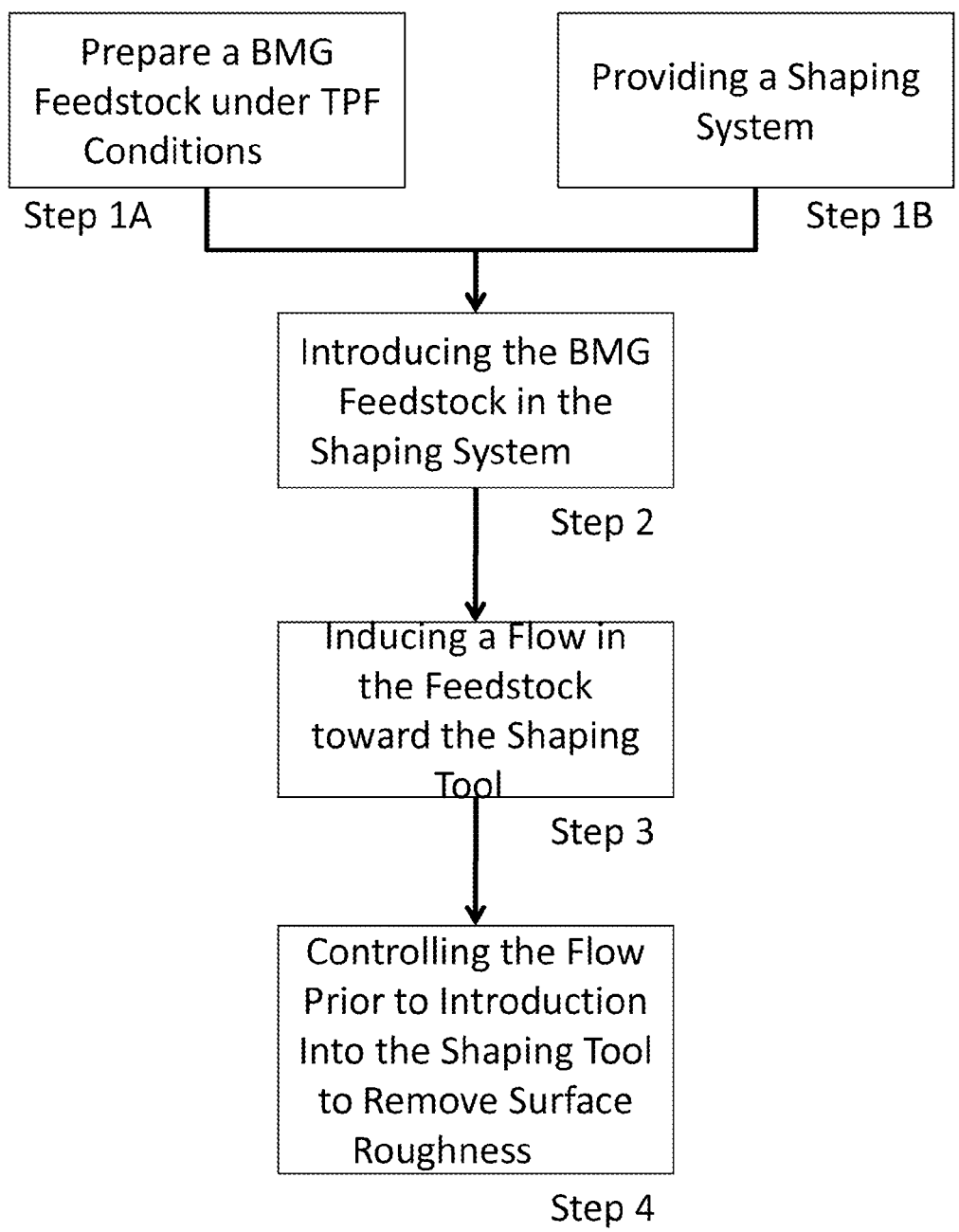
FIG. 3A provides a flow chart of the method of surface smoothing in accordance with an embodiment of the invention.

Accordingly, as shown in the flow chart provided in FIG. 3A, in broad terms the method of flow-pattern surface smoothening of BMG articles during forming in accordance with the current invention includes the following general steps:

Preparing a feedstock of a BMG material and heating it to a temperature within its thermoplastic casting zone, as described in U.S. Pat. Nos. 7,017,645 and 7,794,553, the disclosures of which are incorporated herein by reference (STEP 1A);

Providing a shaping system that includes a pre-forming surface or channel in fluid communication with a forming tool, such as, for example, a mould or die (STEP 1B);

Introducing the BMG material onto the pre-forming surface or channel in the shaping system such that the outer surfaces of the BMG material are in contact with the surface or walls of the pre-forming channel at an initial contact point (STEP 2);

Inducing the material to flow along the surface from the initial contact point toward the shaping tool (STEP 3); and Controlling the flow of the BMG material such that the contact-line of the alloy removes the initially roughened surface of BMG and replaces it with a clean surface from the bulk of the BMG prior to the BMG coming into contact with the shaping tool (STEP 4).

Figure 3B:
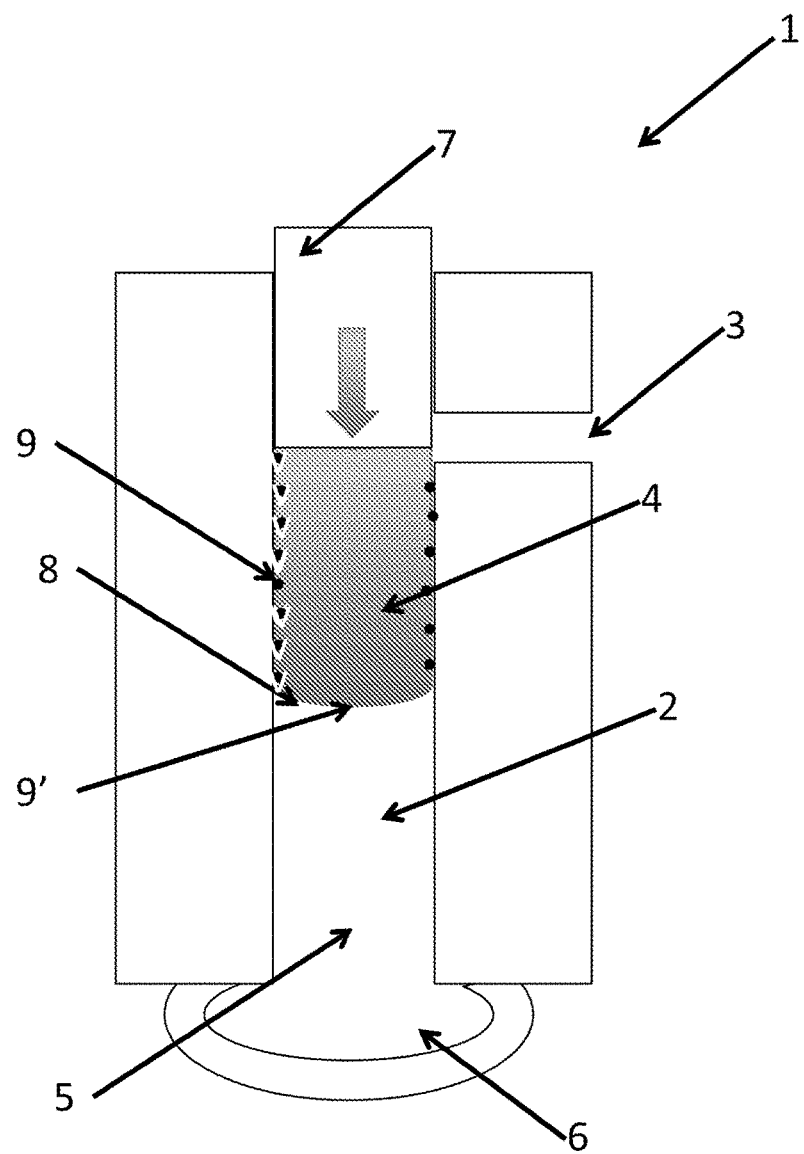
FIG. 3B provides a schematic of a system for surface smoothing in accordance with an embodiment of the invention.

A schematic of a shaping system in accordance with the invention is shown schematically in FIG. 3B. As shown, the system (1) includes a pre-forming substrate or channel (2) having an inlet (3) through which a BMG material (4) may be introduced into the system, and an outlet (5) in fluid communication with a forming tool (6). Although the pre-forming substrate or channel is shown as an elongated passage in the embodiment shown in FIG. 3B, it should be understood that the pre-forming substrate or channel may take the form of any combination of walls or substrates with which the contact line of the flowing BMG may interact to remove the initial roughness of the BMG that also form a fluid passage from the initial contact point of the BMG to the forming tool. Likewise, as will be discussed in greater detail below, the forming tool can take any form suitable for shaping the BMG, including, for example, a die tool, a mould tool, an extrusion tool etc.

The system is also provided with a pressurizing device (7) capable of inducing a flow into the BMG such that the BMG sample flows through the pre-forming substrate or channel from its initial contact point at the inlet into the forming tool. This pressurizing tool can take any form suitable to induce a flow in the BMG under TPF conditions, such as, for example, a hydraulic piston, etc. Finally, the pre-forming channel is engineered to ensure that the flow of the BMG material along its passage is sufficiently long to ensure that the contact-line (8) of the alloy against the walls of the pre-forming channel removes the initially roughened surface (9) of BMG and replaces it with a clean surface (9') from the bulk of the BMG through interfacial flow from the bulk of the BMG to the outer surface of the BMG prior to the BMG coming into contact with the shaping tool, as discussed above.

Figure 4:
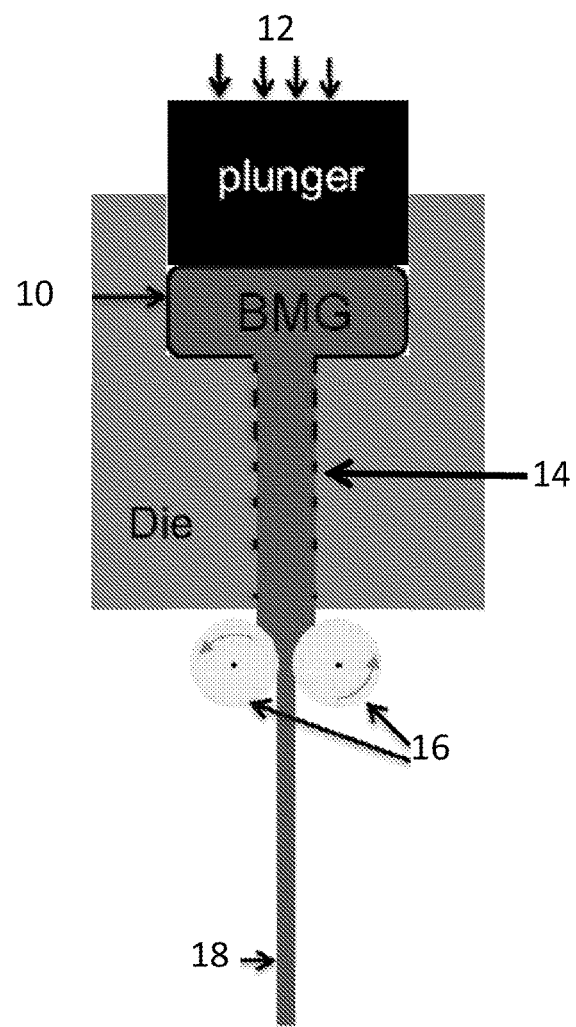
FIG. 4 provides a schematic of an exemplary method of forming a BMG in accordance with the current invention.

Although the above discussion has focused on how to produce a "smooth" contact-line in a BMG flow and a generic shaping system utilizing the method, it should be understood that the inventive method can be used to direct this clean "flow" of BMG into any desired shaping tool. For example, the method of surface cleaning and smoothening demonstrated above can, be extended to a continuous process. In such a process, the method of the invention is used to generate a flow pattern in which clean material from the bulk of the BMG moves to the surface, replacing the initially contaminated surface in a TPF-based BMG extrusion process, which is characterized by creep flow. As shown in FIG. 4, by combining the current method with a TPF-based extrusion process, in which a BMG heated to its thermoplastic forming temperature (10) is extruded under pressure (12) through an extrusion channel (14) until a flow-smoothed leading edge is formed and then the flow-smoothed BMG is directed through hot rollers (16), large, thin sheets (18) with ultrasmooth surfaces or nano-patterns can be fabricated. As demonstrated in this schematic, during extrusion the rough surface layer is removed from the advancing BMG by the flow pattern method, and then the clean extrudate can be rolled between two smooth rollers to yield thin smooth BMG sheets.

It will be understood that the ability to replicate atomically smooth surfaces or sub-nanometer structures using such a process depends critically on the dynamic contact angle, θ, between the viscous BMG and the substrate. For complete anti-wetting (θ=180°), smoothening or replication of features below 100 nm requires impractically high pressures. Complete wetting (θ=0°), on the other hand, facilitates the replication of the substrate surface, but separation of the BMG from the substrate becomes difficult. Therefore, an intermediate dynamic contact angle of approximately 90° is ideal from a processing point of view where the reproduction of such sub-nanometer structures are desired.

Figure 5:
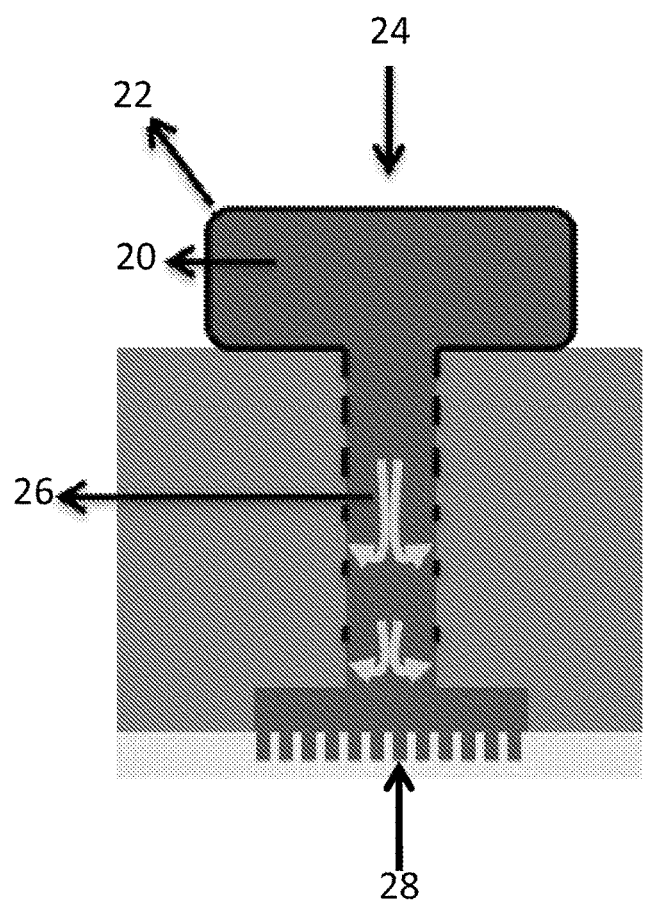
FIG. 5 provides a schematic of another exemplary method of forming a BMG in accordance with the current invention.

Although the above discussion has focused on a continuous process, it should be understood that batch extrusion processes can also incorporate the current invention. For example, as shown in FIG. 5, a schematic of a standard batch mould is shown attached at the end of an extrusion channel. Again, as described above, the BMG (20) with a rough outer surface (22) is extruded under pressure (24) through an extrusion channel (26) before coming in contact with the nano-mould (28). In such a system the extrusion flow channel is engineered in accordance with the current invention such that the surface contaminants and impurities are removed by flow-patterning thereby exposing a clean BMG supercooled liquid contact-line prior to introduction into the mould. Such a process is particularly well-suited for use in moulding features that are smaller than 50 nm. This is because the surface roughness of as-cast BMG from conventional processes is typically larger than 50 nm. Thus, for replicating features in the range of 50 nm or smaller, the BMG surface has to be cleaned, and the current process allows for the cleaning of the BMG surface and the moulding of features smaller than 50 nm in a single step.

Figure 6:
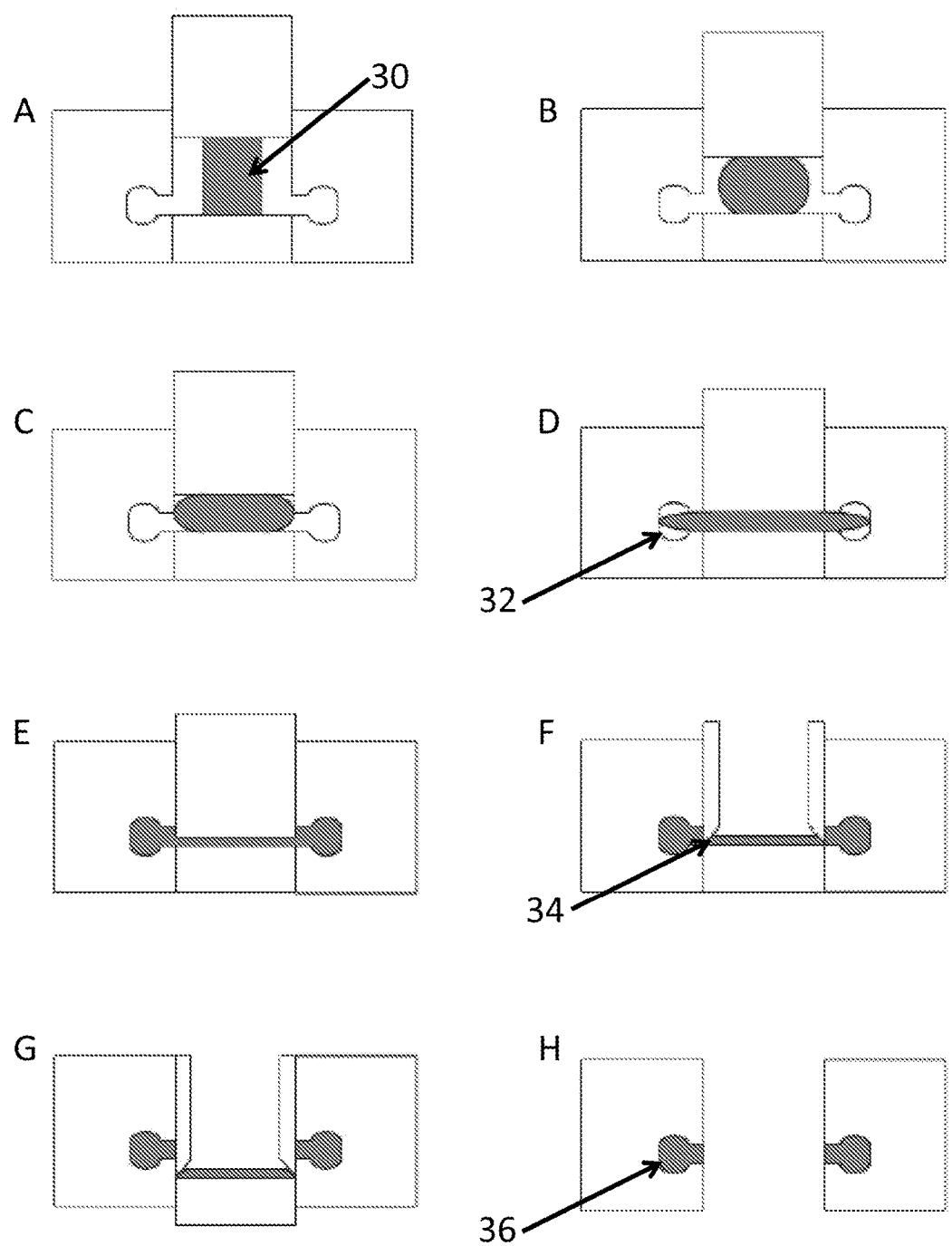
FIGS. 6A to 6H provide a series of schematics of yet another exemplary method of forming a BMG in accordance with the current invention.

The above discussion has focused on continuous and batch processes that are based on an extrusion method. It should be understood that the current invention can also be used in compression moulding processes. In such an embodiment, as shown schematically in FIG. 6, the flow of the TPF process can be engineered such that the initial contact area (30) of the BMG with the mould is not a part of the final component (FIG. 6A). As the BMG surface area increases during compression (FIGS. 6B and 6C) a fresh leading-edge BMG surface is generated by the flow of clean BMG material from the bulk to the surface. The fresh material, free of the initial rough surface layer fills the mould cavity (32) designed for the specific parts (FIGS. 6D and 6E). The extra material can be subsequently cut via a suitable cutting tool (34) to yield free standing 3D parts (36) with uniform smooth surfaces (FIGS. 6F to 6H).

Figure 7:
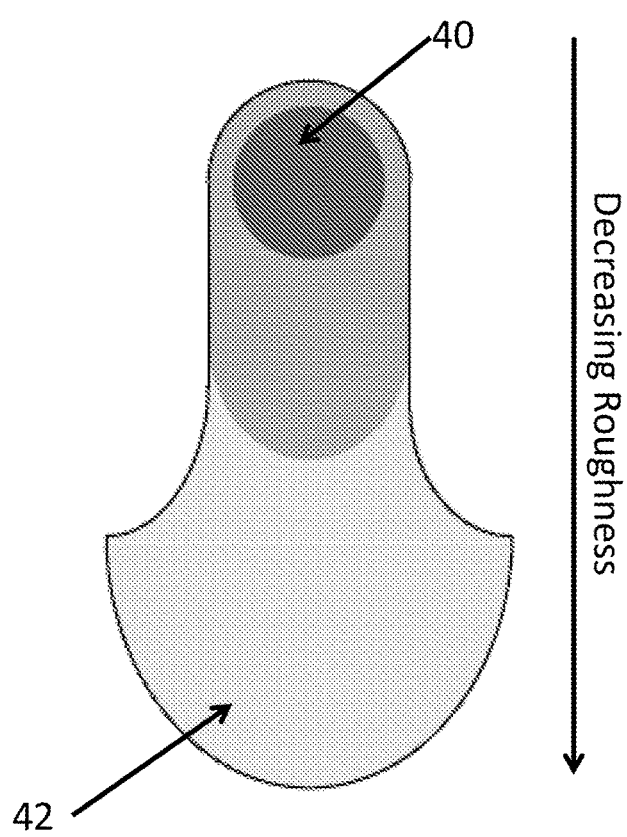
FIG. 7 provides a schematic of still another exemplary method of forming a BMG in accordance with the current invention.
Figure 8:
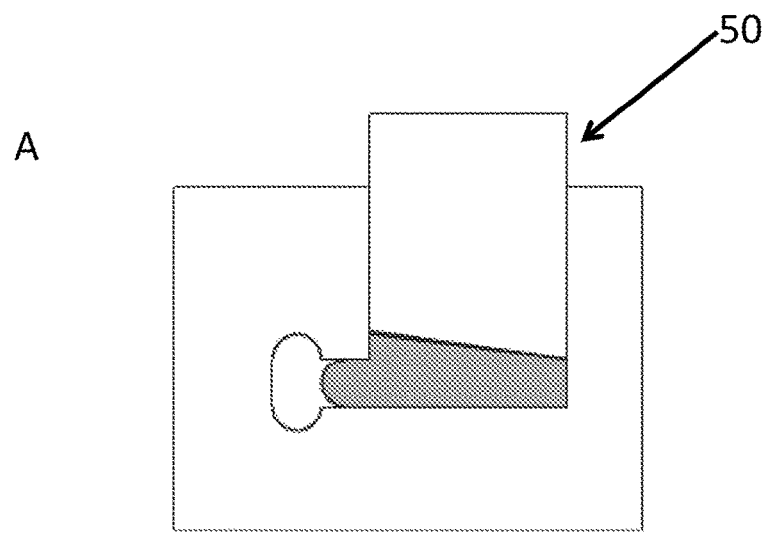
FIGS. 8A and 8B provide schematics of still yet another exemplary method of forming a BMG in accordance with the current invention.
Figure 8:
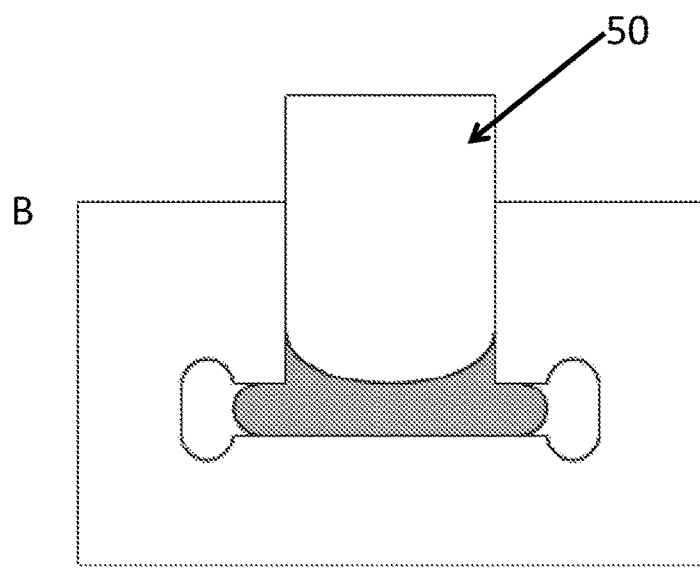

A schematic showing how the surface roughness decreases from the initial point of contact (40) with the advance of the contact-line of the BMG into the final shaping mould (42) is shown in FIG. 7. As described previously, the key to the operation of the invention, is engineering the flow channel (e.g., changing its shape or length) to ensure that the BMG material that ultimately fills the mould cavity has been flow smoothed sufficiently for the desired application. Although the above discussion has focused on the channel that leads to the mould, it should be understood that in such a compression moulding method, the flow of the BMG can also be engineered by modifying the compression load applied to the BMG. For example, as shown in FIGS. 8A and 8B, the shape of the compression plunger (50) can be modified to induce a desirable flow pattern or direction in the BMG depending on the final moulded shape desired, such as, to direct the flow in a single direction (FIG. 8A) or in two different directions (FIG. 8b).

Figure 9:
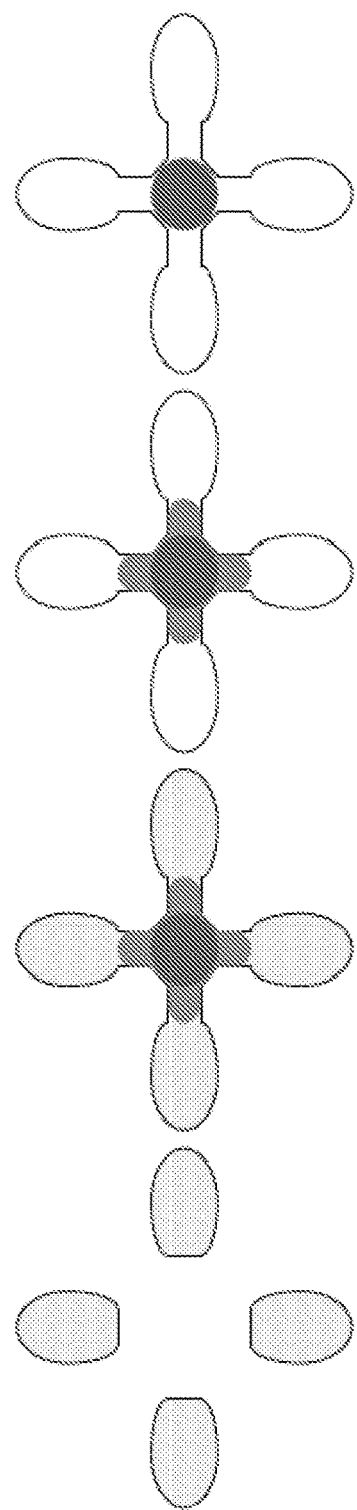
FIG. 9 provides a schematic of still yet another exemplary method of forming multiple parts of a BMG in accordance with the current invention.

Finally, it should be understood that the flow pattern smoothing process of the instant invention can also be applied to applications in which multiple pieces are made simultaneously. An example of a compression mould capable of supporting flow pattern smoothing is shown schematically in FIG. 9. Although a four-piece mould is shown in this example, it should be understood that the method is generally applicable to any arbitrary number of pieces.

Discussion of Flow Pattern Smoothing on the Atomic Scale

The above discussion has focused on gross smoothing of the surface. While in this method the fresh BMG surface generated by the invention is free of initial surface roughness and appears uniformly smooth for most optical and aesthetic applications, in order to generate atomically smooth surfaces a combination of the contact-line motion described above, atomically smooth flow channel walls (such as mould substrates or extruding die or rollers), and high resistance to oxidation is required. In particular, it has been shown that the stress due to velocity gradient diverges in the proximity of the moving contact-line. (J. Schroers, Acta Materialia 56 (3), 471-478 (2008), the disclosure of which is incorporated herein by reference.) This stress can be estimated as $\sim\eta u/r_c$, where $\eta$ is the viscosity of fluid, u is the velocity of contact-line, and $r_c$ is the cut-off distance from the contact-line beyond which continuum mechanics is valid. Thus, the stresses in the proximity (1-10 nm) of the moving contact-line can be as high as $10^3$-$10^5$ MPa. Such high stresses smoothen the residual roughness of the viscous BMG on an atomic scale.

Figure 10:
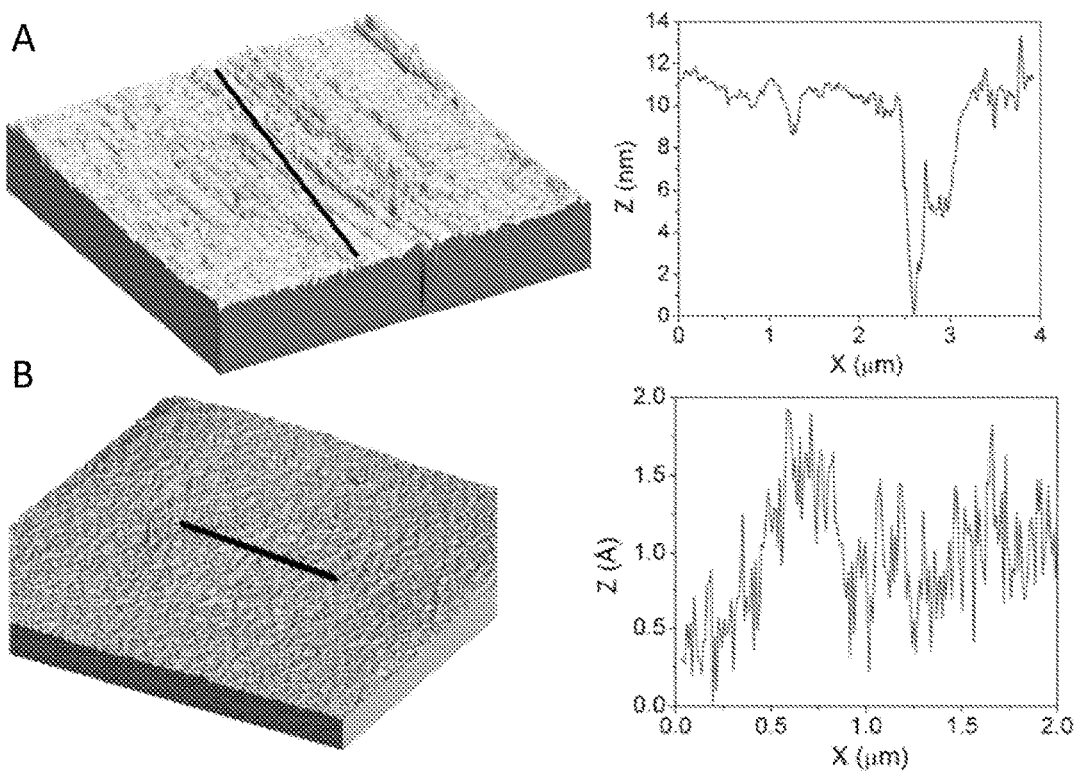
FIGS. 10A and 10B provide SEM micrographs and data plots of Zr and Pt-BMG surfaces wherein: (A) provides a surface scan of Zr-BMG thermoplastically formed on mica which exhibits a rough surface due to pronounced oxidation (peak-to-valley roughness is about 12 nm), and (B) provides a surface scan of Pt-BMG thermoplastically formed on silicon having a peak-to-valley roughness of about 2 nm, which is about the size of a PMMA molecule FIGS. 11A to 11C provide SEM micrographs of Pt-BMG surfaces prepared by different methods wherein: (A) shows a surface of a molten droplet quenched in water, showing a rough surface, (B) shows a mechanically polished surface with scratches generated by hard slurry particles and abrasive papers with decreasing particle sizes, followed by final polishing using alumina slurry with 0.3 μm particles, and (C) shows a Pt-BMG thermoplastically formed on silicon exhibiting a smooth surface that extends over a large area.

However, the effectiveness of smoothening on atomic scale also critically depends on the interplay between the time scale for surface oxidation, $t_c$ and the inverse of strain rate $\dot{\epsilon}$, which sets the rate of surface layer removal. Accordingly, for the inventive method to function on the atomic level, the oxidation time should be much longer than the timescale for surface layer removal in order to generate a clean BMG surface during TPF. This requirement is fulfilled for BMGs containing inert metals such as Pt, Au, Pd, Ni (highly preferred), but not for BMGs containing highly reactive metals such as Zr, Ti, Cu. This is because in these highly reactive BMGs the clean material that flows from the bulk to the BMG-air interface oxidizes before reaching the contact-line, thus preventing optimum oxide removal. This is evident in comparing FIGS. 10A and 10B. In FIG. 10A a Zr-BMG thermoplastically formed on mica yields a rough surface with maximum a peak-to-valley roughness of about 12 nm, which is significantly rougher than the Pt-BMG shown in FIG. 10B. Some exemplary materials capable of meeting these requirements may be found in the following patents and patent publications, the disclosures of which are incorporated herein by reference: U.S. Pat. Nos. 7,582,172 and 7,896,982, the disclosure of which are incorporated herein by reference.

In general terms, it has now been discovered that atomically smooth metal surfaces can be generated by thermoplastic forming of metallic glasses under specific flow conditions and with BMGs incorporating inert metals. The thermoplastically formed surface formed in accordance with the invention is two orders of magnitude smoother than a polished surface of the same alloy. In addition, this process is capable of generating atomically smooth surfaces and replicating nano-scale features on non-planar shapes in a single processing step, providing a versatile toolbox for nanofabrication.

EXEMPLARY EMBODIMENTS OF THE INVENTION

In the following, we describe a number of exemplary procedures for obtaining ultrasmooth metallic glass surfaces by TPF that incorporate the flow pattern smoothing method of the current invention. As previously discussed, although the inventive method is capable of producing smooth or patterned surfaces on non-planar complex shapes, in order to facilitate characterization by atomic force microscopy (AFM), flat BMG surfaces were generated by TPF on polished silicon and cleaved mica. Two BMG formers with high thermoplastic forming ability, $Pt_{57.5}Cu_{14.7}Ni_{5.3}P_{22.5}$ (Pt-BMG) and $Zr_{44}Ti_{11}Cu_{10}Ni_{10}Be_{25}$ (Zr-BMG), were investigated. (J. Schroers, Acta Materialia 56 (3), 471-478 (2008), the disclosure of which is incorporated herein by reference.) The selection of these two BMGs allows the effect of oxidation on surface roughness to be demonstrated, since Zr-BMG exhibits a higher affinity for oxygen compared to Pt-BMG. The glass transition temperatures of Pt- and Zr-BMG are 230° C. and 350° C., respectively, while the temperatures used for TPF are 270° C. for Pt-BMG and 430° C. for Zr-BMG, respectively. TPF was carried out in air under 50 MPa pressure applied for 60 sec. After TPF, the surface topography of the BMG was examined by scanning electron microscopy (SEM) and contact-mode AFM. Although these specific materials and forming conditions were used, as previously discussed, it will be understood that other BMGs with different glass transition temperatures may be used in accordance with the current invention.

Example 1

Comparison of Pt-BMGs on Silicon

Figure 11:
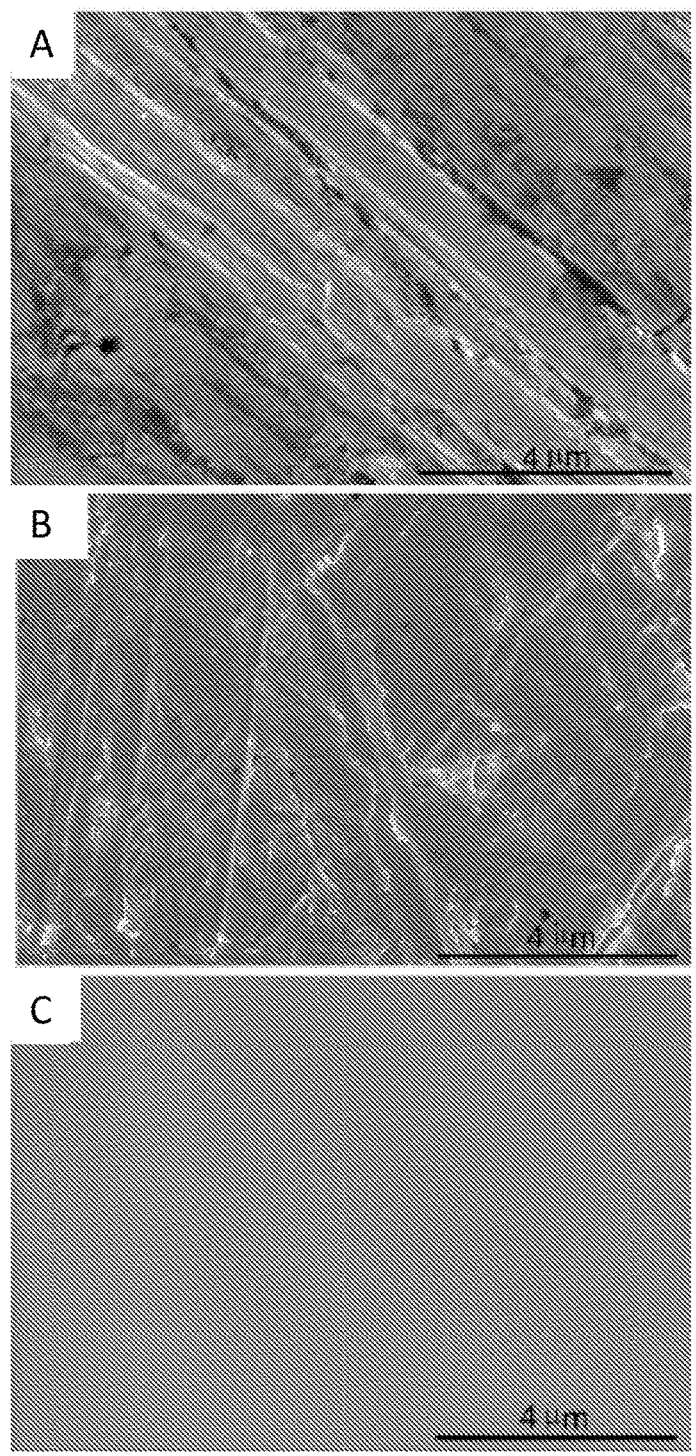

In this first example, a study was conducted to show FIG. 11A shows an SEM image of a Pt-BMG surface prepared by water quenching. Although the metal droplet did not touch any solid surface during vitrification, its surface exhibits a roughness consisting of random pits and corrugations of varying wavelengths. This roughness might originate from various sources such as the formation of a rigid oxide layer or other surface contaminants. FIG. 11B shows an SEM image of a polished Pt-BMG surface. The surface is significantly damaged, as indicated by the presence of multiple scratches generated by hard slurry particles. FIG. 11C displays an SEM image of Pt-BMG that was thermoplastically formed on CMP-polished silicon using the flow pattern smoothing process of the instant application, generating a smooth and featureless surface extending over a large area. Surprisingly, flow pattern TPF of Pt-BMG results in a much smoother surface than was obtained via polishing. Because SEM images reflect only a qualitative overview of the surface roughness, a quantitative analysis was carried out using AFM.

Example 2

Comparison of Pt-BMGs on Silicon and Mica

Figure 12:
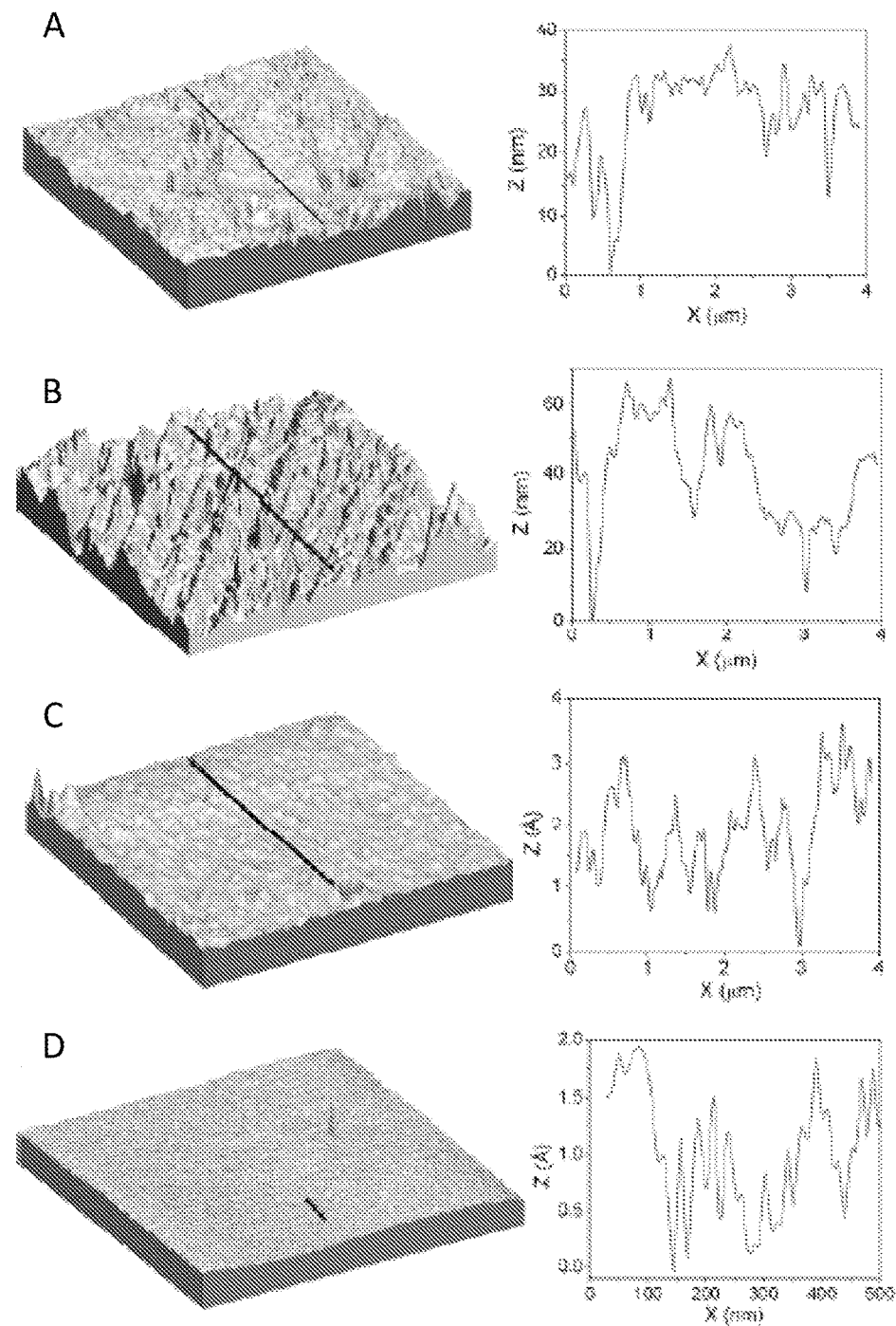
FIGS. 12A to 12D provide AFM images of a 5 μm×5 μm area of four BMG surfaces and the corresponding height profiles along the indicated lines, wherein: (A) shows a Pt-BMG molten droplet quenched in water having a maximum peak-to-valley roughness of about 25 nm for the as-cast Pt-BMG, (B) shows a mechanically polished Pt-BMG surface having an increased peak-to-valley roughness of 60 nm, (C) shows a Pt-BMG surface thermoplastically formed on silicon having a maximum peak-to-valley roughness of only 3.5 Å, and (D) shows an atomically smooth surface obtained after thermoplastic forming of Pt-BMG on cleaved mica having a peak-to-valley roughness in the 500 nm horizontal scan of about 1 Å.

An AFM image of the as-cast Pt-BMG (FIG. 12A) measured over a 5×5 µm² area shows a rough surface. The corresponding height profile along the line indicates a maximum peak-to-valley roughness of about 25 nm. This roughness increases to 60 nm after mechanical polishing, as indicated by the AFM image and height profile featured in FIG. 12B. FIG. 12C shows an AFM image of Pt-BMG thermoplastically formed on CMP-polished silicon using flow pattern smoothing. The height profile reveals a maximum peak-to valley roughness of about 3.5 Å, which is the typical roughness of CMP-polished silicon wafers. (C. Teichert, J. F. Mackay, D. E. Savage et al., *Applied Physics Letters* 66 (18), 2346-2348 (1995), the disclosure of which is incorporated herein by reference.) Finally, an AFM image and a height profile of Pt-BMG thermoplastically formed on cleaved mica are presented in FIG. 12D. Remarkably, the surface of Pt-BMG formed on mica exhibits near atomic-scale smoothness over a large area, with a peak-to valley roughness smaller than 1 Å.

Example 3

Investigation of Pt-BMGs on Mica

Figure 13:
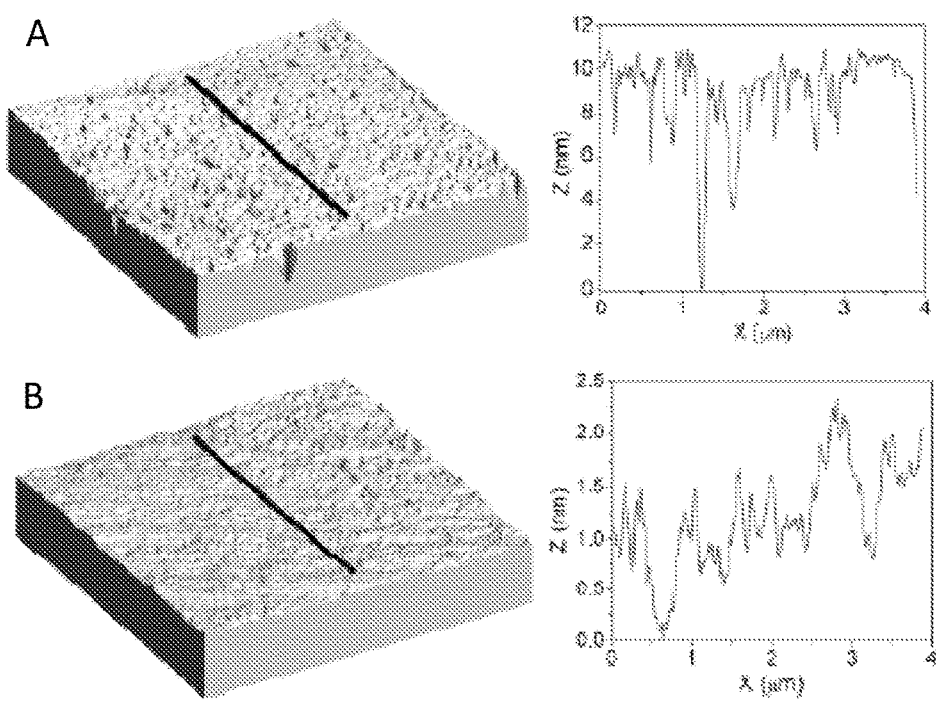
FIGS. 13A & B provide AFM images and the corresponding height profiles along the indicated lines of a 5 μm×5 μm area of crystallized-BMG and PMMA surfaces, wherein: (A) shows a Pt-BMG thermoplastically formed on mica and subsequently crystallized under pressure having a peak-to-valley roughness from 1 Å to 12 nm, and (B) shows a PMMA thermoplastically formed on silicon at 160° C. under 50 MPa having a peak-to-valley roughness of about 2 nm, which is about the size of a PMMA molecule.

In order to further investigate the effect of the materials' inherent structure on the minimum surface roughness, Pt-BMG was formed on mica and subsequently crystallized under pressure. Thereby, the average peak-to-valley roughness of crystallized Pt-BMG increased to 12 nm (FIG. 13A), which is two orders of magnitude larger than the amorphous Pt-BMG (FIG. 12D) and comparable to the grain size often times observed in devitrified metallic glasses. (R. Busch, S. Schneider, A. Peker et al., *Applied Physics Letters* 67 (11), 1544-1546 (1995), the disclosure of which is incorporated herein by reference.) It is therefore possible to conclude that the sub-angstrom level smoothness achieved with amorphous Pt-BMG is made possible by its amorphous structure, which exhibits homogeneity on the atomic scale. To further illustrate the effect of the materials' inherent structure on the minimum surface roughness, a commonly used photoresist, PMMA (poly-methyl-methacrylate) was formed on silicon. The surface and the corresponding height profile (FIG. 13B) reveal an average peak-to-valley roughness of the PMMA surface of about 2 nm, which is comparable to the size of individual PMMA molecules. F. Hua, Y. G. Sun, A. Gaur et al., *Nano Letters* 4 (12), 2467-2471 (2004), the disclosures of which are incorporated herein by reference.) Thus, PMMA, which is widely used in nano-imprinting, has a minimum roughness that is limited by its molecular size and therefore cannot be used where the feature size or roughness requirement is below 2 nm. Table 1, below, compares the average peak-to-valley roughness values of different surfaces, along with the ability of each material/process combination to generate nano-scale patterns on planar and non-planar surfaces.

TABLE 1

Comparison of peak-to-valley roughness values for different materials

| Material | Smoothening & patterning methods | Typical roughness | Nano-patterning on surfaces Planar | Non-planar |
|---|---|---|---|---|
| Silicon | Polishing, lithography | <3-5 Å | yes | no |
| Mica | Cleaving | <1 Å | no | no |
| Metals | Sputtering, Polishing, electroplating | 1-500 nm | limited | limited |
| Polymers | TPF, spin coating, nanoimprinting | ~2 nm | yes | limited |
| Pt-BMG | TPF-based methods | 1-10 Å | yes | yes |
| Crystallized Pt-BMG | Polishing | 12 nm | no | no |

As shown, thermoplastic forming of BMGs using the inventive flow pattern smoothing can generate atomically smooth and patterned surfaces that can be readily applied on planar and complex 3D shapes whereas the other techniques are mainly applicable for planar surfaces.

CONCLUSION

Figure 14:
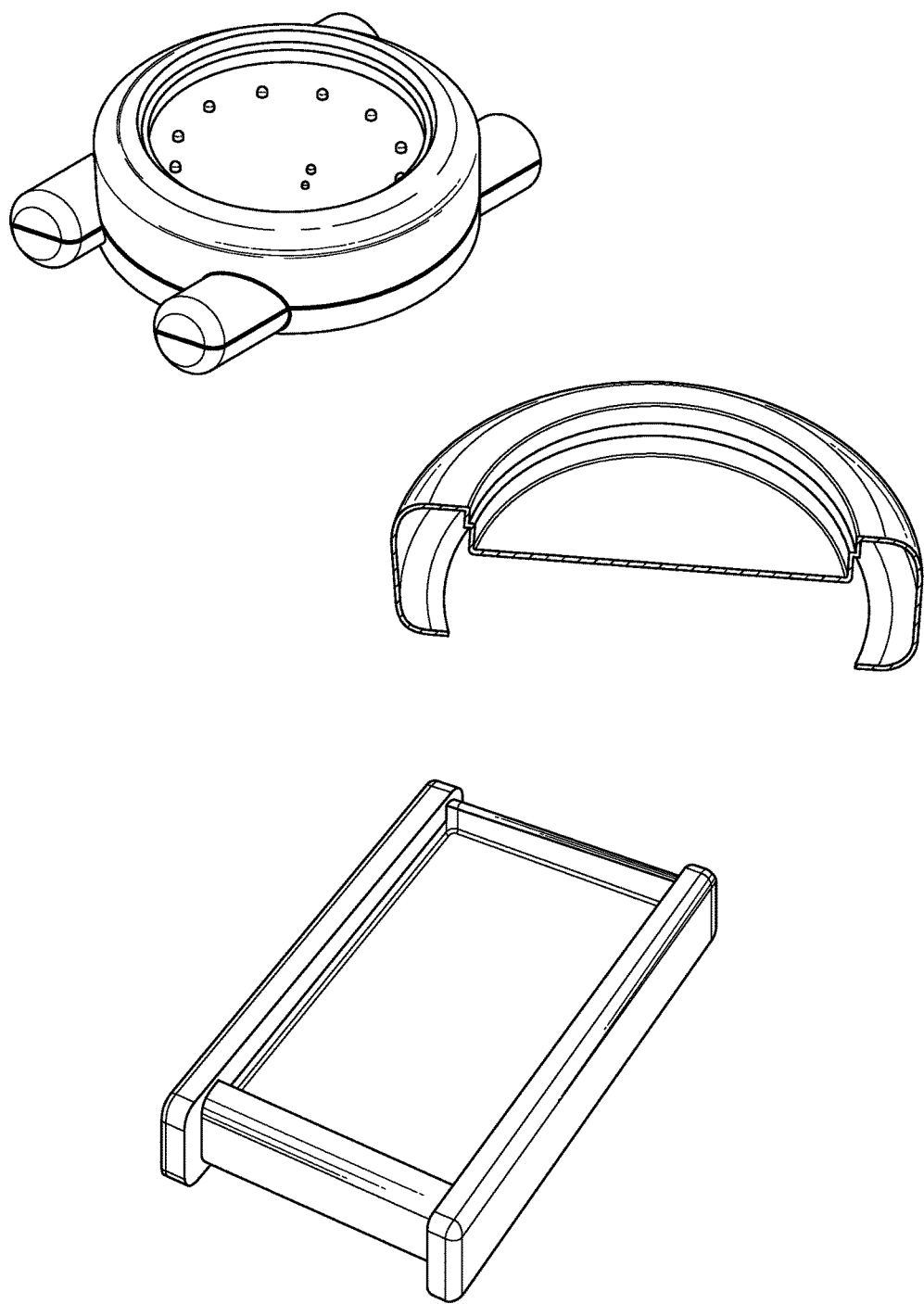
FIG. 14 provides images of exemplary parts formed in accordance with the method of the current invention.

The current invention provides a method of forming atomically smooth metal surfaces by flow pattern smoothing and thermoplastic forming BMGs in air. This is enabled by the combination of a homogeneous amorphous structure of the BMG and an inventive flow pattern process used during the forming process. The viscous BMG flowing between solid surfaces acts as a creeping flow, and surface smoothening is facilitated by the flow associated with the contact-line motion, which removes rigid particles from the advancing BMG-air interface. Numerous applications for atomically smooth surfaces already exist and will benefit from the invention. The versatility of the presented process, which can yield ultrasmooth surfaces combined with patterns on complex non-planar parts in a single processing step, suggests that new intriguing possibilities will emerge from this technological development. For example, the instant invention is capable of:
  making ring shaped objects, forming from inside out;
  reducing the starting roughness of BMG feedstocks;
  generating uniformly smooth surfaces which are free of initial contact area between the mould and BMG;
  creating atomically smooth BMG surfaces;
  creating large smooth sheets for substrate applications in self-assembly, such as, for example, grapheme synthesis;
  working in air for BMG based inert metals such as Pt, Au, Pd, etc.;
  working with more reactive metal based BMGs, where protective atmosphere is needed;
  producing oxide/surface flaw free pre-shapes for subsequent blow moulding or TPF to create one or many parts;

producing surfaces that can be patterned precisely;
improving the joining process as mechanical locking small features need clean surface for intimate contact/strong bond;
producing ultra smooth/nano patterned sheets;
producing watch cases/bezels, jewelry, perfume bottles, electronic casings (FIG. 14); and
provide parisons for blow moulding that are challenging to cast, with smooth surfaces.

DOCTRINE OF EQUIVALENTS

Those skilled in the art will appreciate that the foregoing examples and descriptions of various preferred embodiments of the present invention are merely illustrative of the invention as a whole, and that variations in the steps and various components of the present invention may be made within the spirit and scope of the invention. Accordingly, the present invention is not limited to the specific embodiments described herein but, rather, is defined by the scope of the appended claims.

What is claimed is:

1. A method of shaping a bulk metallic glass comprising:
providing a bulk metallic glass feedstock having an inner bulk region surrounded by an initial rough outer surface region, the feedstock being heated to a temperature within thermoplastic zone of the bulk metallic glass;
placing the outer region of the feedstock into contact with at least one solid surface in fluid communication with at least one shaping tool;
inducing the feedstock to flow along the at least one solid surface toward the shaping tool such that the leading edge of the flow of the feedstock forms a contact-line with the solid surface, and wherein the motion of the contact-line along the solid surface induces an interfacial flow of the feedstock material from the bulk towards the solid surface, wherein within 1 to 10 nm of the contact-line a stress of $10^3$-$10^5$ MPa is exerted on the outer surface of the feedstock; and
maintaining the flow of the feedstock along the solid surface until substantially all of the initial outer region of the feedstock at the contact-line of the alloy is replaced with a new smooth outer region formed from the interfacial flow of the bulk of the feedstock to the outer region of the feedstock prior to the feedstock coming into contact with the at least one shaping tool.

2. The method of claim 1, wherein the feedstock is placed into contact with at least two parallel solid surfaces.

3. The method of claim 2, wherein the at least two solid surfaces form a channel.

4. The method of claim 1, wherein the at least one shaping tool is selected from the group consisting of dies, compression moulds and extrusion tools.

5. The method of claim 1, wherein the shaping tool includes at least one feature that has a dimensional scale of less than 50 nm.

6. The method of claim 1, wherein the point of initial contact between the feedstock and the solid surface is outside the area of the at least one shaping tool.

7. The method of claim 1, wherein the step of inducing the flow is performed by applying a pressure to the feedstock.

8. The method of claim 1, further comprising varying the application of force to select the direction and speed of the flow of the feedstock.

9. The method of claim 1, wherein there are at least two shaping tools.

10. The method of claim 1, wherein the bulk metallic glass is based on an inert material selected from the group consisting of Pt, Au, Pd and Ni.

11. A method of shaping a bulk metallic glass comprising:
providing a bulk metallic glass feedstock having an inner bulk region surrounded by an initial rough outer surface region, the feedstock being heated to a temperature within thermoplastic zone of the bulk metallic glass;
placing the outer region of the feedstock into contact with at least one solid surface in fluid communication with at least one shaping tool, wherein the at least one solid surface is atomically smooth;
inducing the feedstock to flow along the at least one solid surface toward the shaping tool such that the leading edge of the flow of the feedstock forms a contact-line with the solid surface, and wherein the motion of the contact-line along the solid surface induces an interfacial flow of the feedstock material from the bulk towards the solid surface; and
maintaining the flow of the feedstock along the solid surface until substantially all of the initial outer region of the feedstock at the contact-line of the alloy is replaced with a new smooth outer region formed from the interfacial flow of the bulk of the feedstock to the outer region of the feedstock prior to the feedstock coming into contact with the at least one shaping tool.

12. A method of shaping a bulk metallic glass comprising:
providing a bulk metallic glass feedstock having an inner bulk region surrounded by an initial rough outer surface region, the feedstock being heated to a temperature within thermoplastic zone of the bulk metallic glass;
placing the outer region of the feedstock into contact with at least one solid surface in fluid communication with at least one shaping tool;
inducing the feedstock to flow along the at least one solid surface toward the shaping tool such that the leading edge of the flow of the feedstock forms a contact-line with the solid surface, and wherein the motion of the contact-line along the solid surface induces an interfacial flow of the feedstock material from the bulk towards the solid surface; and
maintaining the flow of the feedstock along the solid surface until substantially all of the initial outer region of the feedstock at the contact-line of the alloy is replaced with a new smooth outer region formed from the interfacial flow of the bulk of the feedstock to the outer region of the feedstock prior to the feedstock coming into contact with the at least one shaping tool;
wherein an article formed in the at least one shaping tool has a peak-to-valley surface roughness of from 1 to 10 nm.

* * * * *

UNITED STATES PATENT AND TRADEMARK OFFICE
CERTIFICATE OF CORRECTION

| | | |
|---|---|---|
| PATENT NO. | : 9,604,269 B2 | Page 1 of 1 |
| APPLICATION NO. | : 13/808969 | |
| DATED | : March 28, 2017 | |
| INVENTOR(S) | : Golden Kumar et al. | |

It is certified that error appears in the above-identified patent and that said Letters Patent is hereby corrected as shown below:

In the Specification

Column 1, Lines 8-10:

Remove: "The U.S. Government has certain rights in this invention pursuant to Grant No. CMMI-0928227 awarded by the National Science Foundation."

Insert: --This invention was made with government support under Grant No. 0928227 awarded by the National Science Foundation. The government has certain rights in the invention.--

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*